3,804,946
DENTIFRICES CONTAINING CRYSTALLINE SILICA

Michael Harrison, Newcastle upon Tyne, and Kenneth Tomlinson, Bramhall, England, assignors to Colgate-Palmolive Company, New York, N.Y.
No Drawing. Continuation of application Ser. No. 217,645, Jan. 3, 1972, which is a continuation of application Ser. No. 57,326, July 22, 1970, both now abandoned. This application Feb. 26, 1973, Ser. No. 335,787
Int. Cl. A61k 7/16
U.S. Cl. 424—54          13 Claims

ABSTRACT OF THE DISCLOSURE

Dentifrice containing as vehicular material a polishing agent of water-insoluble crystalline silica having particles of a size up to about 5 microns, a mean particle size up to about 1.1 microns and a surface area of up to about 50,000 cm.$^2$/gm. The silica is homogeneously distributed throughout the dentifrice and is in contact with the components of the dentifrice. The silica polishing agent is desirably used with cationic prophylactic agents, such as 1,6-di-(p-chlorophenyl biguanidohexane).

---

This application is a continuation of application Ser. No. 217,645, filed Jan. 3, 1972 which is a continuation of application Ser. No. 57,326, filed July 22, 1970, both now abandoned.

This invention relates to a dentifrice preparation containing as vehicular material a polishing agent of highly desirable effect.

Dentifrices, which are used to clean the teeth, generally contain a substantial amount of a polishing agent which acts to remove stains on the teeth. Agents employed have included clacium carbonate, dicalcium phosphates, tricalcium phosphate, calcium pyrophosphate and corresponding magnesium salts.

It has also been suggested to use types of silicon containing materials, such as silica gel or amorphous silica, as dentifrice polishing agents. This has not been successful since some materials containing silicon have not been sufficiently abrasive to effect a desirable degree of polishing. On the other hand, some materials containing silicon, such as sand or quartz have had such size and abrasiveness that they could effect an undesirable wear on dentine and to avoid this it was necessary to coat such materials with a resinous material to decrease the etching effect. This procedure, however, is complicated and prevents the polishing agent from being a vehicle for all components of the dentifrice; that is, prevents it from being homogeneously distributed throughout the dentifrice and in contact with all the dentifrice components.

It is an advantage of this invention to provide a silica material of such polishing character that it can be effectively employed as the vehicular material of the dentifrice, homogeneously distributed therethrough and in contact with the remaining components of the dentifrice.

It is a further advantage of this invention to provide a dentifrice in which cationic materials can be effectively employed.

In accordance with certain of its aspects, this invention relates to a dentifrice preparation containing as vehicular material at least 30% by weight of a water insoluble crystalline silica having particles of sizes up to about 5 microns, a mean particle size of up to about 1.1 microns and a surface area of up to about 50,000 cm.$^2$/gm., said crystalline silica being homogeneously distributed throughout the dentifrice and in contact with the components of the dentifrice.

The vehicular material of the instant invention includes a waterinsoluble crystalline silica having a particle size of up to (that is, not more than) about 5 microns. When employed in quantity the particles of silica may be considered on the average to be substantially spheriodal. Thus, since the surface area of spheriodal particles increases inversely to the square of the mean particle size, when the mean particle size is 1.1 microns the surface area is 20,600 cm.$^2$/gm. Some mean particle sizes and surface areas of crystalline silica are indicated below:

TABLE I

| Surface mean particle size microns: | Surface area (cm.$^2$/gm.) |
|---|---|
| 4.19 | 5,400 |
| 2.70 | 8,400 |
| 2.06 | 11,000 |
| 1.1 | 20,600 |
| 0.4 | 50,000 |

Thus, crystalline silicas having mean particle sizes between about 0.4 and 1.1 microns may be used in this invention.

The actual size of each particle of crystalline silica in the vehicular material of the instant invention of course varies, but the particles generally are about 5 microns or less. The particle size ranges of some commercially available crystalline silicas are indicated below:

TABLE II

| Surface mean particle size (microns) | Percent of particles finer than— | | | |
|---|---|---|---|---|
| | 5 microns | 10 microns | 15 microns | 30 microns |
| 0.4 | 100 | | | |
| 1.1 | 100 | | | |
| 2.06 | 75 | 100 | | |
| 2.7 | 55 | 90 | 100 | |
| 4.19 | 27 | 55 | 77 | 100 |

The crystalline silica employed in the instant invention is nonporous and has a neutral pH of 7.0 when dispersed in water. It is typically employed in the presence of minor and trace amounts of impurities (that is less than 1% total) such as ferric oxide, aluminum oxide, titanium oxide, calcium oxide and magnesium oxide.

The mean particle size of crystalline silica is about 0.4–5.0 microns, preferably about 1.1 microns. The mean particle size may exceed 1.1 microns but as aforementioned, substantial numbers of the particles should not exceed about 5 microns. The polishing agent containing crystalline silica is employed as the vehicular material of a dentifrice in amount of at least about 30% by weight, say 30%–99%, typically about 30%–75% in a dental cream or dental tablet and about 70%–99% in a tooth powder. The crystalline silica of the instant invention may be a sole polishing agent or it may be used together with other polishing agents. It should be present in amount of at least about 30% by weight of the dentifrice and should be present in major amount (that is at least half) when in mixture with another polishing agent.

Polishing agents which may be used with the crystalline silica of the invention include dicalcium phosphate, tricalcium phosphate, insoluble sodium metaphosphate, aluminum hydroxide, magnesium carbonate, calcium carbonate, calcium pyrophosphate, calcium sulfate, polymethyl methacrylate, bentonite, etc., including suitable mixtures thereof. These polishing agents when employed are present in minor amount (that is up to half) in the polishing agent. If desired a minor amount of crystalline silica having substantial numbers of particles of size greater than 5 microns may be employed with the crystalline material having particles generally less than 5 microns in size in order to adjust the degree of polishing as desired.

In the preparation of toothpowders, it is usually sufficient to admix mechanically, e.g., by milling, the various solid ingredients, in appropriate quantities and particles sizes.

In dental cream formulations, the liquids and solids should necessarily be proportioned to form a creamy mass of desired consistency which is extrudable from an aerosol container or a collapsible, e.g., aluminum or lead, tube. In general, the liquids in the dental cream will comprise chiefly water, glycerine, aqueous solutions of sorbitol, propylene glycol, polyethylene glycol 400, etc. including suitable mixtures thereof. It is advantageous usually to use a mixture of both water and a humectant or binder such as glycerine or sorbitol. The total liquid content will generally be about 20–75% by weight of the formulation. It is preferred to use also a gelling agent in dental creams such as the natural and synthetic gums and gum-like materials, e.g., Irish moss, gum tragacanth, methyl cellulose hydroxyethyl cellulose, sodium carboxymethyl cellulose, polyvinylpyrrolidone, and starch, usually in an amount up to about 10%, and preferaby about 0.2–5% of the formulation. The preferred gelling agents are methyl cellulose and hydroxyethyl cellulose.

Organic surface-active agents used in the compositions of the present invention to achieve increased prophylactic action, assist in achieving thorough and complete dispersion of the instant compositions throughout the oral cavity, and render the instant compositions more cosmetically acceptable. The organic surface-active material may be anionic, nonionic, ampholytic, or cationic in nature, and it is preferred to employ as the surface-active agent a detersive material which imparts to the composition detersive and foaming properties. Suitable such detergents are water-soluble salts of higher fatty acid monoglyceride monosulfates, such as the sodium salt of the monosulfated monoglyceride of hydrogenated coconut oil fatty acids, higher alkyl sulfates, such as sodium lauryl sulfate, alkyl aryl sulfonates, such as sodium dodecyl benzene sulfonate, higher alkyl sulfoacetates, higher fatty acid ester of 1,2 dihydroxy propane sulfonates, and the substantially saturated higher aliphatic acyl amides of lower aliphatic amino carboxylic acid compounds, such as those having 12 to 16 carbons in the fatty acid, alkyl or acyl radicals, and the like. Examples of the last mentioned amides are N-lauroyl sarcosine, and the sodium, potassium and ethanolamine salts of N-lauroyl, N-myristoyl or N-palmitoyl sarcosine which should be substantially free from soap or similar higher fatty acid material which tends to substantially reduce the effect of these compounds. The use of these sarcosinate compounds in dentifrice compositions of the present invention is particularly advantageous since these materials exhibit a prolonged and marked effect in the inhibition of acid formation in the oral cavity due to carbohydrates breakdown in addition to exerting some reduction in the solubility of tooth enamel in acid solutions.

Other particularly suitable surface-active materials include nonionic agents such as condensates of sorbitan monostearate with approximately 60 moles of ethylene oxide, condensates of ethylene oxide with propylene oxide condensates of propylene glycol available under the trademark ("Pluronics") and amphoteric agents such as quaternized imidazole derivatives which are available under the trademark "Miranol" such as Miranol C$_2$M. Cationic surface-active germicides and antibacterial compounds such as di-isobutylphenoxyethoxyethyl dimethyl benzyl ammonium chloride, benzyl dimethyl stearyl ammonium chloride, tertiary amines, having one fatty alkyl group (of from 12 to 18 carbon atoms) and two (poly) oxyethylene groups attached to the nitrogen (typically containing a total of from about 2 to 50 ethanoxy groups per molecule) and salts thereof with acids and compounds of the structure

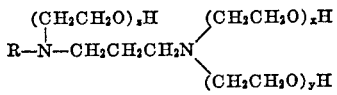

where R is a fatty alkyl group containing from about 12 to 18 carbon atoms, and $x$, $y$, and $z$ total 3 or higher, as well as salts thereof with mineral or organic acids, may also be used. It is preferred to use from about 0.05 to 5% by weight of the foregoing surface-active materials in the instant oral preparations.

Various other materials may be incorporated in the oral preparations of this invention. Examples thereof are coloring or whitening agents, preservatives, silicones, chlorophyll compounds, ammoniated materials such as urea, diammoniumphosphate and mixtures thereof, and other constituents. These adjuvants are incorporated in the instant compositions in amounts which do not substantially adversely affect the properties and characteristics desired and are selected and used in proper amount depending upon the particular type of preparation involved.

The relative polishing abilities of the crystalline silica of various mean particle sizes was tested on dentine from extracted teeth.

Various percentages of several types of crystalline silica having particle sizes, mean particle sizes and surface areas indicated in Tables I and II above, were added to a dentifrice having the following composition:

| Component: | Percent |
|---|---|
| Amphoteric surface-active agent (Miranol C$_2$M) | 1.0 |
| Glycerine | 20 |
| Hydroxyethyl cellulose | 1.5 |
| Flavor | 1.0 |
| Preservative | 0.5 |
| Deionized water q.s. to 100 less percent of silica. | |

The results obtained were graphed and the units of polishing capability obtained from the graphs are indicated in Table III below.

TABLE III

| Item | Silica Mean particle size (microns) | Silica Percent particles up to 5 microns size | Silica Surface area (cm²/g.) | Percent silica in dental cream | Units of polishing ability |
|---|---|---|---|---|---|
| a | 4.19 | 27 | 5,400 | 3 | 225 |
| b | | | | 6 | 280 |
| c | 2.70 | 55 | 8,400 | 10 | 225 |
| d | | | | 14 | 250 |
| e | | | | 20 | 325 |
| f | 2.06 | 75 | 11,000 | 10 | 175 |
| g | | | | 20 | 250 |
| h | | | | 25 | 280 |
| i | | | | 30 | 320 |
| j | | | | 34 | 350 |
| k | | | | 40 | 375 |
| l | 1.1 | 100 | 20,600 | 10 | 100 |
| m | | | | 20 | 185 |
| n | | | | 25 | 215 |
| o | | | | 30 | 240 |
| p | | | | 32 | 250 |
| q | | | | 40 | 285 |
| r | | | | 45 | 300 |
| s | | | | 54 | 325 |
| t | | | | 60 | 343 |
| u | | | | 70 | 349 |

The cosmetically acceptable dentifrice should contain at least about 30% of the polishing agent. Furthermore, the polishing agent should have a polishing ability of at least about 240 units and no more than about 350 in order not to effect too little or too much polishing. Therefore, it is apparent from the data in Table III, that when the crystalline silica having a mean particle of 1.1 microns is employed in amount of about 30% by weight and more of the dentifrice, desirable polishing is effected. This is particularly the case when this crystalline silica is present in the dentifrice in amount of somewhat less than 40% to somewhat more than 50%, since a polishing ability of about 275 to 325 units, particularly 300, is most desirable. Grades of crystalline silica having a mean particle size of less than 1.1 microns and a surface area of up to about 50,000 also possess desirable polishing ability over a wide range of polishing agent contents in a dentifrice.

The grades of a crystalline silica having mean particle sizes of 4.19 microns and 2.70 microns do not possess desirable polishing ability and that having a mean particle size of 2.06 microns possess effective polishing ability at concentration above 30% of the dentifrice only over a narrow range terminating at about 34.3% of the dentifrice. Minor amounts of these grades of crystalline silica or of other polishing agents may of course be combined with crystalline silica having a mean particle size of up to about 1.1 microns, particles of sizes of to about 5 microns and surface area of up to about 50,000 cm.$^2$/g. in order to modify the polishing abilities as desired. In other words, the dentifrice may contain as the polishing agent a major amount (25% by weight of the dentifrice) of crystalline silica of item "$n$" of Table III, having a polishing ability of about 215 units and a minor amount (say 20% by weight of the dentifrice) of another polishing agent, to produce a dentifrice with a polishing ability of about 300 units.

In accordance with certain additional aspects of this invention, cationic antibacterial agents are included in the compositions of the present invention. Such agents include:

$N^1$-(4-chlorobenzyl)-$N^5$-(2,4-dichlorobenzyl)biguanide
p-chlorophenyl biguanide
4-chlorobenzhydryl biguanide;
4-chlorobenzhydrylguanylurea;
N-3-lauroxpropyl-$N^5$-chlorobenzylbiguanide;
1,6-di-p-chlorophenylbiguanidohexane;
1-(lauryldimethylammonium)-8-(p-chlorobenzyldimethylammonium) octane dichloride;
5,6-dichloro-2-guanidinobenzimidazole;
$N^1$-p-chlorophenyl-$N^5$-laurylbiguanide;
5-amino-1,3-bis (2-ethylhexyl)-5-methylhexahydropyrimidine;

and their nontoxic acid addition salts, particularly the fluorides and the dihydrogen fluorides. 1,6-di-(p-chlorophenylbiguanidohexane) is particularly preferred. These agents may be used in amounts ranging from about 0.01%–5% and preferably about 0.05%–1.0% by weight of the dentifrice.

Cationic antibacterial agents have been included in dentifrice compositions of the prior art. These agents have provided antibacterial effect to such compositions. However, this effect has often been somewhat limited, possibly due to the presence of major amounts of ionic polishing agents in such dentifrices. These polishing agents are substantially water-insoluble, but do have some amount of water-solubility which may limit the effect of the cationic antibacterial agents.

In the instant invention, the polishing maerial is at least a major amount of a particular crystalline silica which is non-ionic in character. Therefore, the polishing agent does not provide substantial amounts of anionic material which may inhibit the effect of the antibacterial agents. Thus, it has particularly been found that a dentifrice containing 0.50% of 1,6-di-(p-chlorophenylbiguanidohexane) and 45% of silica having particles up to 5 microns in size, a mean particle size of 1.1 microns and a surface area of 20,600 cm.$^2$/g. caused a reduction in calculus formation of 35% in rats which had been fed a calculus-producing diet compared to a control dentifrice in which the antibacterial agent was omitted. This exhibited the high degree of antibacterial effects of the cationic antibacterial agent in the nonionic crystalline silica dentifrice.

It is also desirable to use salts, such as the gluconate or acetate salt of 1,6-di-(p-chlorophenylguanidohexane).

Any suitable flavoring or sweetening materials may be employed in formulating a flavor for the compositions of the present invention. Examples of suitable flavoring constituents include the flavoring oils, e.g., oils of spearmint, peppermint, wintergreen, sassafras, clove, sage, eucalyptus, marjoram, cinnamon, lemon and orange, as well as sodium methylsalicylate. Suitable sweetening agents include sucrose, lactose, maltose, sorbitol, sodium cyclamate, perillartine and saccharine. Suitably, flavor and sweetening agent may together comprise from about 0.01 to 5% or more of the compositions of the instant invention.

The compositions of the present invention containing the nonionic crystalline silica polishing agent desirably may also contain a fluorine-containing compound having a beneficial effect on the care and hygiene of the oral cavity, e.g., diminution of enamel solubility in acid and protection of the teeth against decay. Examples thereof include sodium fluoride, stannous fluoride, potassium fluoride potassium stannous fluoride ($SnF_2$-KF) and stannous chlorofluoride. These materials, which dissociate or release fluorine-containing ions, suitably may be present in an effective but nontoxic amount, usually within the range of about 0.01 to 1% by weight of the water-soluble fluorine content thereof. Sodium fluoride and stannous fluoride are particularly preferred, as well as mixtures thereof.

The following specific examples are further illustrative of the nature of the present invention but it is understood that the invention is not limited thereto. The compositions are prepared in the usual manner and all amounts and proportions are by weight unless otherwise specified.

EXAMPLE 1

| | |
|---|---|
| Sodium fluoride | 0.22 |
| Amphoteric surface active agent (Miranol C$_2$M) | 1.0 |
| Silica | 45 |
| Glycerine | 20 |
| Hydroxyethyl cellulose | 1.5 |
| Flavor | 1.0 |
| Preservative | 0.5 |
| Deionized water | q.s. to 100 |

The silica is crystalline has a surface area of 20,600 cm.$^2$/g., has particles substantially all of which are less than 5 microns in size and which have a mean particle of about 1.1 microns, a surface area of about 20,600 cm.$^2$/g.

EXAMPLE 2

| | |
|---|---|
| Sodium monofluorophosphate | 0.82 |
| Nonionic surface agent (pasty polyol-50% polyoxyethylene and 50% polyoxypropylene | 1.0 |
| Lauric diethanolamide | 0.2 |
| Silica (as in Example 1) | 45 |
| Glycerine | 20 |
| Methyl cellulose | 1.5 |
| Flavor | 1.0 |
| Preservative | 0.5 |
| Deionized water | q.s. to 100 |

EXAMPLE 3

| | |
|---|---|
| Sodium N-lauroyl sarcosinate | 1.5 |
| Silica (as in Example 1) | 25 |
| Precipitated chalk | 20 |
| Carboxymethyl cellulose | 1.0 |
| Flavor | 1.0 |
| Preservative | 0.5 |
| Glycerine | 20 |
| Deionized water | q.s. to 100 |

EXAMPLE 4

| | |
|---|---|
| Amphoteric surface-active agent (Miranol C₂M) | 1.0 |
| Silica (as Example 1) | 45.0 |
| Glycerine | 20.0 |
| Hydrated alumina | 2.0 |
| Hydroxyethyl cellulose | 1.5 |
| 1,6-di-(parachlorophenyl biguanido hexane) | 0.5 |
| Flavor | 1.0 |
| Deionized water | q.s. to 100 |

EXAMPLE 5

| | |
|---|---|
| Nonionic surface-active agent (pasty polyol-50% polyoxyethylene 50% polyoxypropylene | 1.0 |
| Lauric diethanolamide | 0.2 |
| 1,6-di-(parachlorophenyl biguanide hexane) | 0.5 |
| Sodium fluoride | 0.22 |
| Silica (as in Example 1) | 30 |
| Polymethyl methacrylate powder | 15 |
| Glycerine | 20 |
| Flavor | 1.0 |
| Deionized water | q.s. to 100 |

EXAMPLE 6

| | |
|---|---|
| Sodium lauryl sulphate | 1.5 |
| Silica (as Example 1) | 25.0 |
| Polymethyl methacrylate powder | 20.0 |
| Glycerine | 10.0 |
| Sorbitol | 10.0 |
| Flavor | 1.0 |
| Preservative | 0.5 |
| Deionized water | q.s. to 100 |

It will be apparent to one skilled in the art that various modifications of the above examples may be made thereto.

EXAMPLE 7

| | |
|---|---|
| Amphoteric surface-active agent | 1.0 |
| Silica (as in Example 1) | 45.0 |
| Glycerine | 20.0 |
| Hydroxyethyl cellulose | 1.5 |
| 1,6-di-(p-chlorophenyl biguanido hexane dihydrogen fluoride | 0.55 |
| Flavor | 1.0 |
| Deionized water | q.s. to 100 |

What is claimed is:

1. A dentifrice preparation containing at least 30% by weight of polishing and vehicular material, at least a major amount by weight of which is a water-insoluble crystalline silica homogeneously distributed and in contact with the components of the dentifrice, said crystalline silica being characterized by having (a) particles of sizes up to 5 microns, a mean particle size about 0.4–1.1 microns, and a surface area of up to about 50,000 cm.²/g. or (b) particles at least 75% of which are finer than 5 microns, a mean particle size of about 1.1–2.06 microns, and a surface area of about 11,000–50,000 cm.²/g., said particles (a) when present being in amount of at least 25% by weight of said dentifrice preparation and said particles (b) when present being in amount of about 20–34.3% by weight of said dentifrice preparation.

2. The dentifrice preparation of claim 1 wherein said water-insoluble crystalline silica is composed of particles (a) and is present in amount of at least 30% by weight and is the sole polishing agent in said dentifrice preparation.

3. The dentifrice preparation of claim 1 wherein said water-insoluble crystalline silica is composed of particles (a) and is present in amount of at least about 25% by weight of said dentifrice preparation and a minor amount of another polishing agent is also present.

4. The dentifrice preparation of claim 1 wherein said water-insoluble crystalline silica is composed of particles (a) and is present in amount of about 30–90% by weight of said dentifrice preparation.

5. The dentifrice preparation of claim 4 wherein said water-insoluble crystalline silica is present in amount of about 30–75% by weight of said dentifrice.

6. The dentifrice preparation of claim 1 wherein about 0.05–1.0% of a cationic antibacterial agent are in contact with the components of the dentifrice.

7. The dentifrice preparation of claim 6 wherein said cationic antibacterial agent is 1,6-di-(p-chlorophenyl biguanido) hexane.

8. A dentifrice preparation as claimed in claim 6 wherein the antibacterial agent is present in the form of a salt in which the anion contains at least one fluoride atom.

9. A dentifrice preparation as claimed in claim 8 wherein the antibacterial agent is 1,6-di-(p-chlorophenyl biguanido) hexane dihydrogen fluoride.

10. The dentifrice preparation of claim 6 wherein a nonionic surface active agent is present.

11. The dentifrice preparation of claim 6 wherein an ampholytic surface active agent is present.

12. The dentifrice preparation of claim 6 wherein said water-insoluble crystalline silica is composed of particles (a).

13. The dentifrice preparation of claim 1 wherein said water-insoluble crystalline silica is composed of particles (b) and is present in amount of about 30–34.3% by weight.

No references cited.

RICHARD L. HUFF, Primary Examiner

U.S. Cl. X.R.

424—52